INVENTOR.
WILLIAM P. FRANKENSTEIN
BY Joseph A. Rave
ATTORNEY

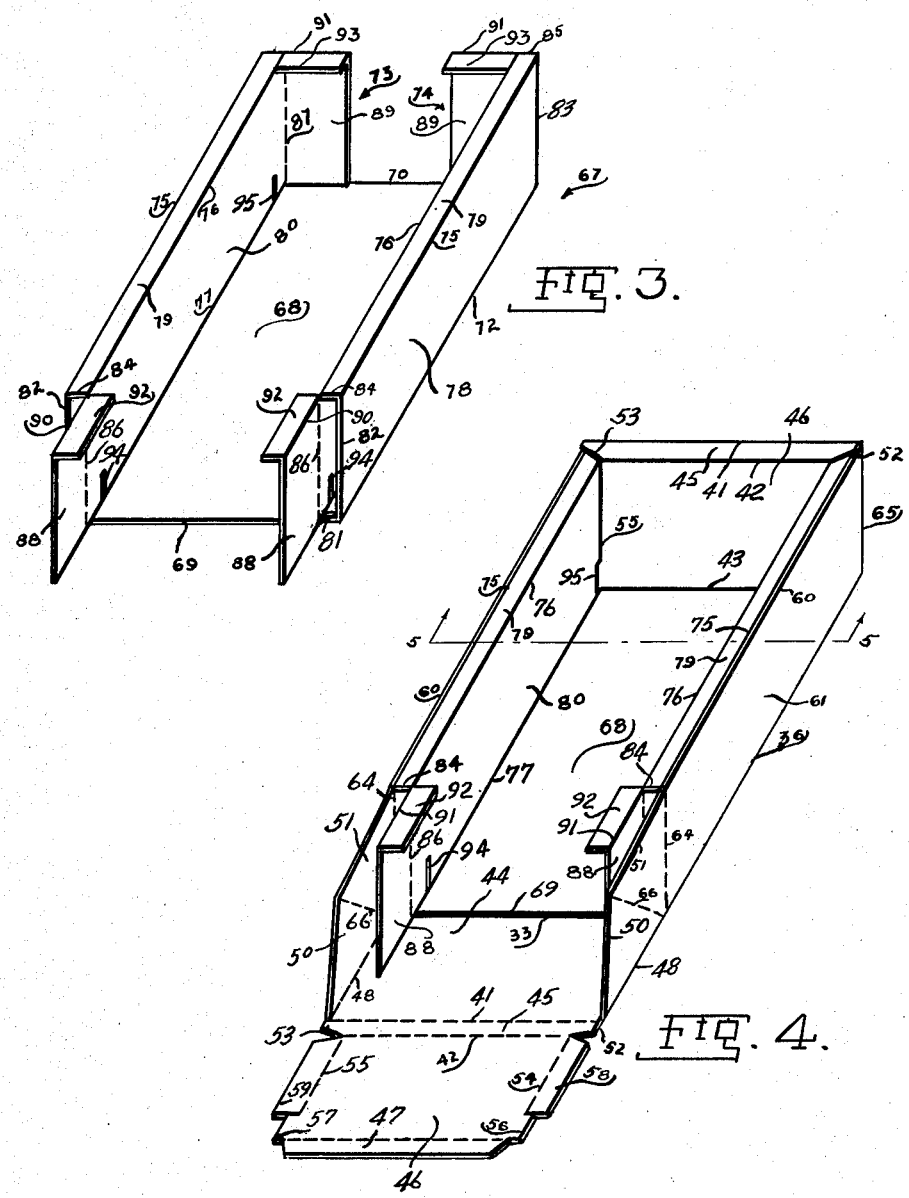

April 7, 1953 — W. P. FRANKENSTEIN — 2,634,044
CARTON
Filed Oct. 18, 1946 — 9 Sheets-Sheet 3
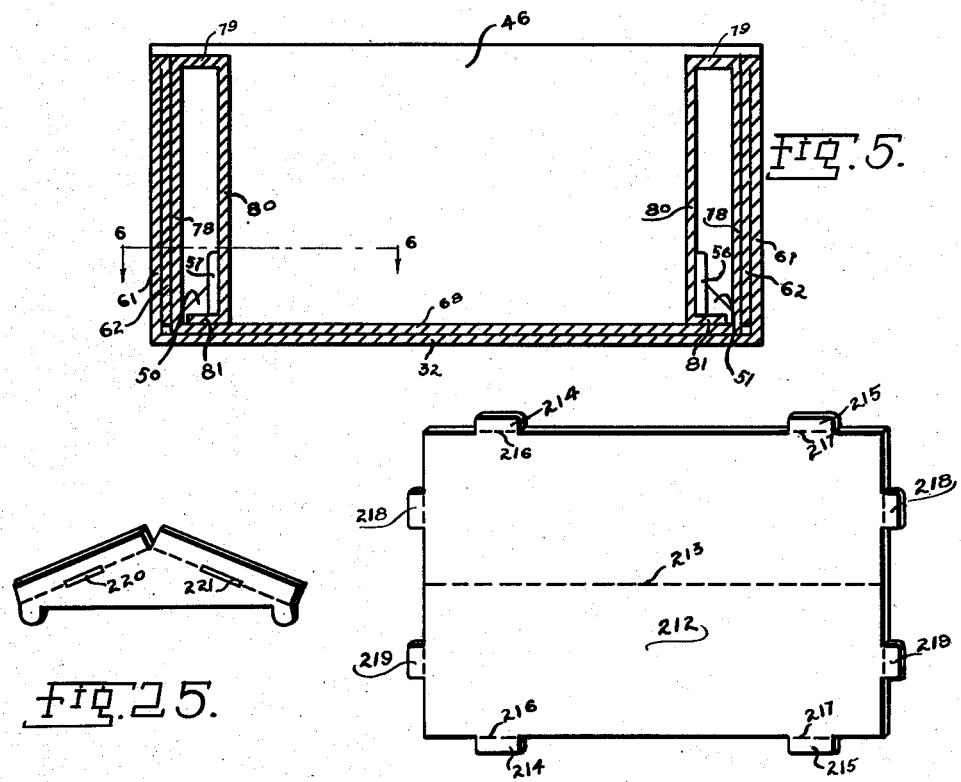
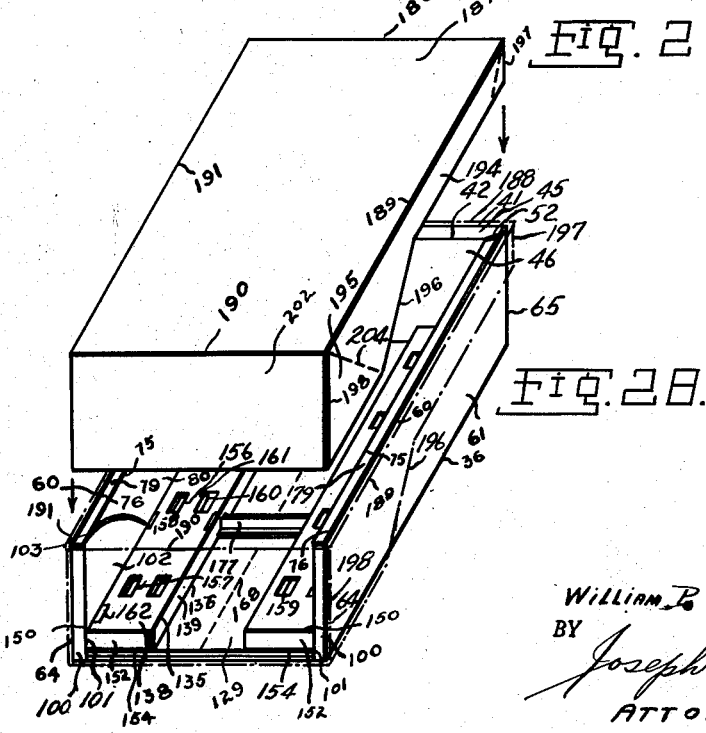
INVENTOR.
WILLIAM P. FRANKENSTEIN
BY Joseph A. Rave
ATTORNEY April 7, 1953  W. P. FRANKENSTEIN  2,634,044
CARTON
Filed Oct. 18, 1946  9 Sheets-Sheet 4
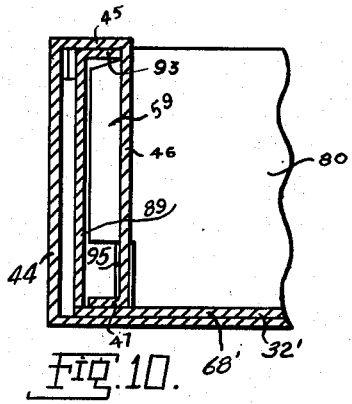
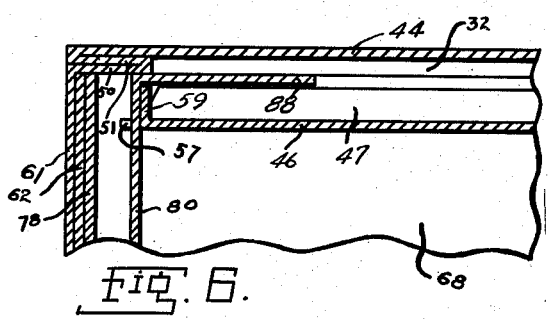
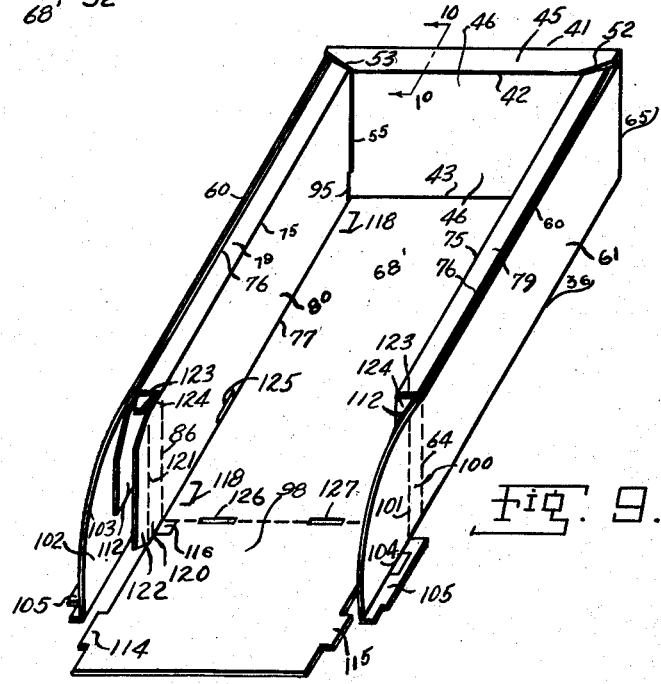
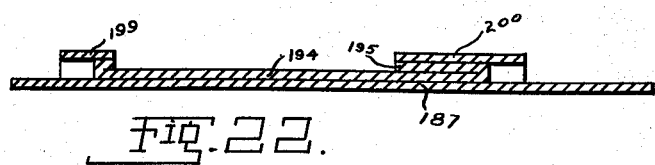
INVENTOR.
WILLIAM P. FRANKENSTEIN
BY
Joseph A. Rave
ATTORNEY April 7, 1953     W. P. FRANKENSTEIN     2,634,044
CARTON
Filed Oct. 18, 1946     9 Sheets-Sheet 5
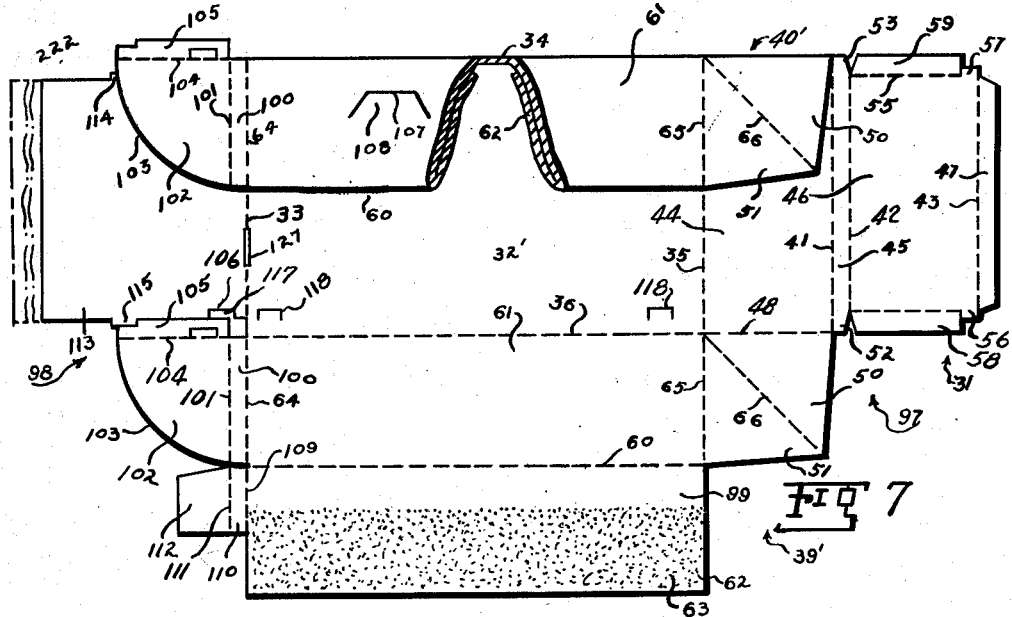
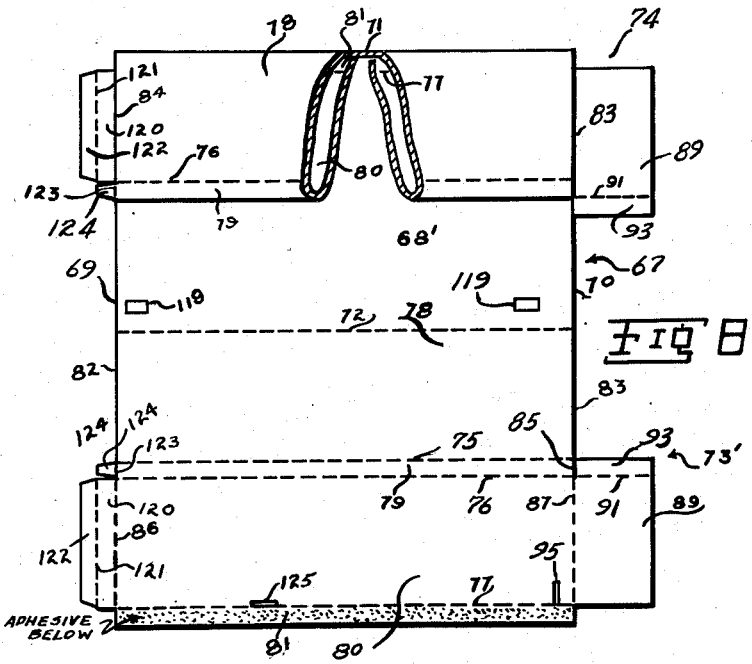
INVENTOR.
WILLIAM P. FRANKENSTIEN
BY
Joseph A. Rave
ATTORNEY

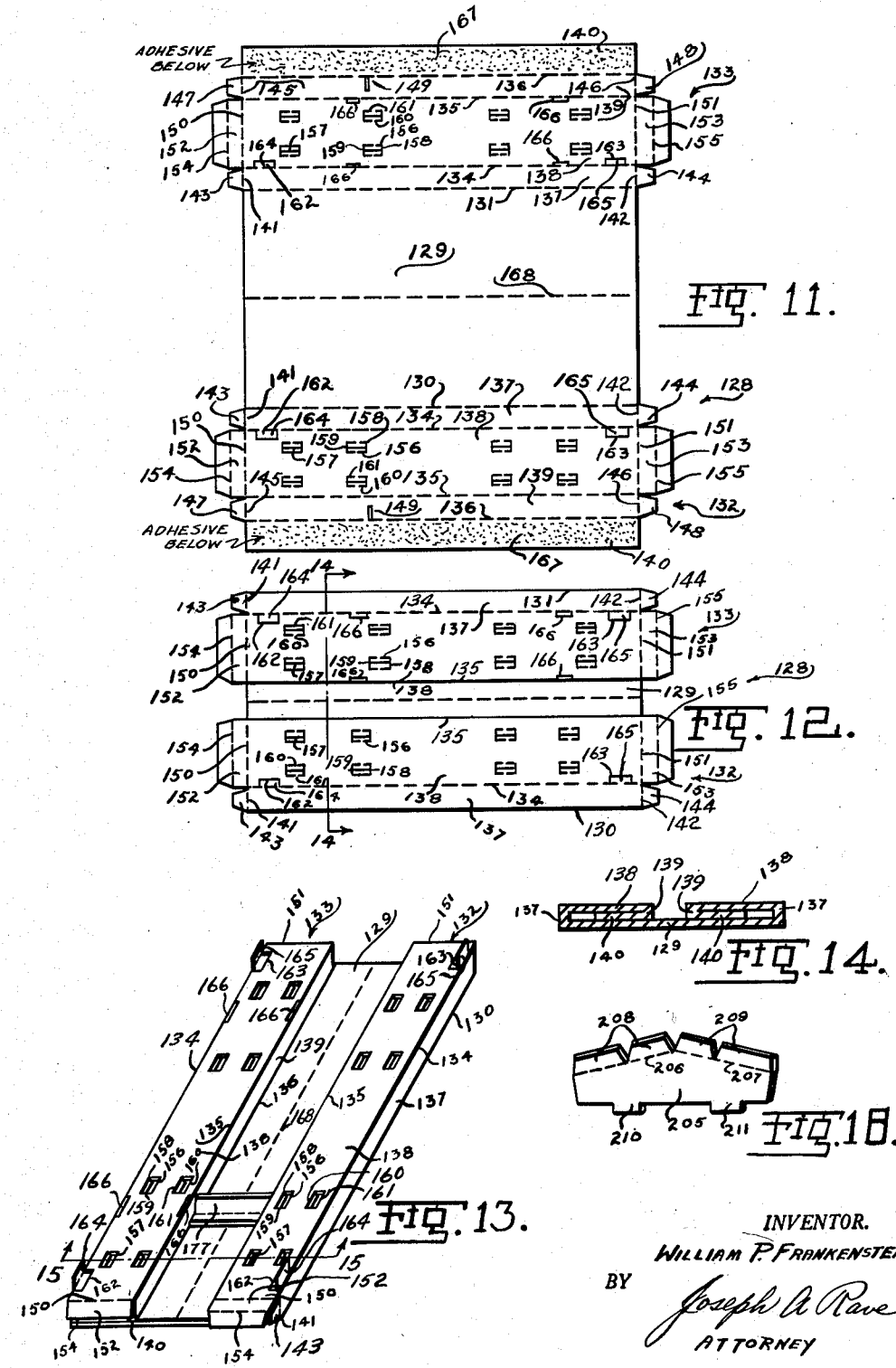

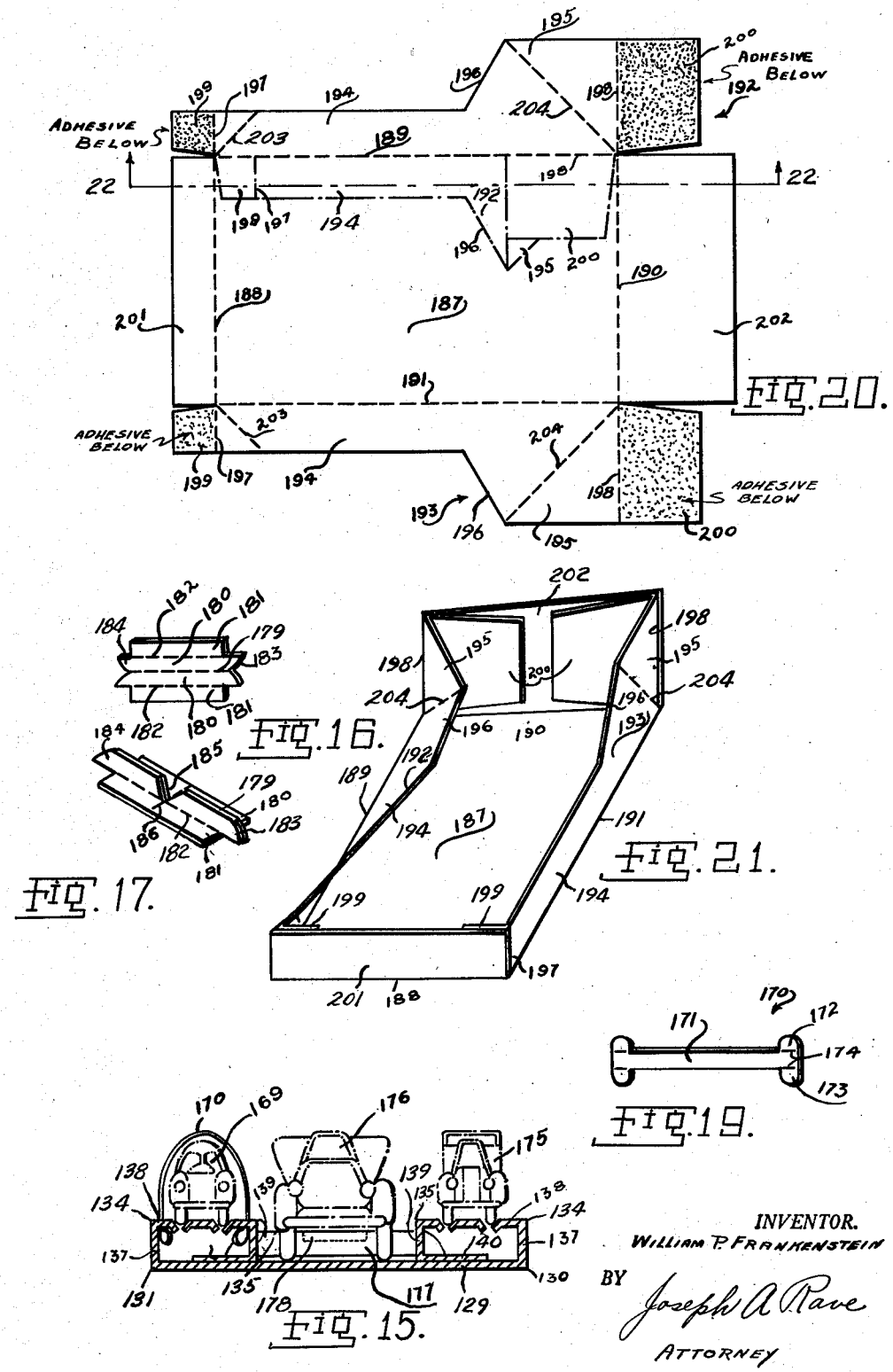

April 7, 1953  W. P. FRANKENSTEIN  2,634,044
CARTON
Filed Oct. 18, 1946  9 Sheets-Sheet 8
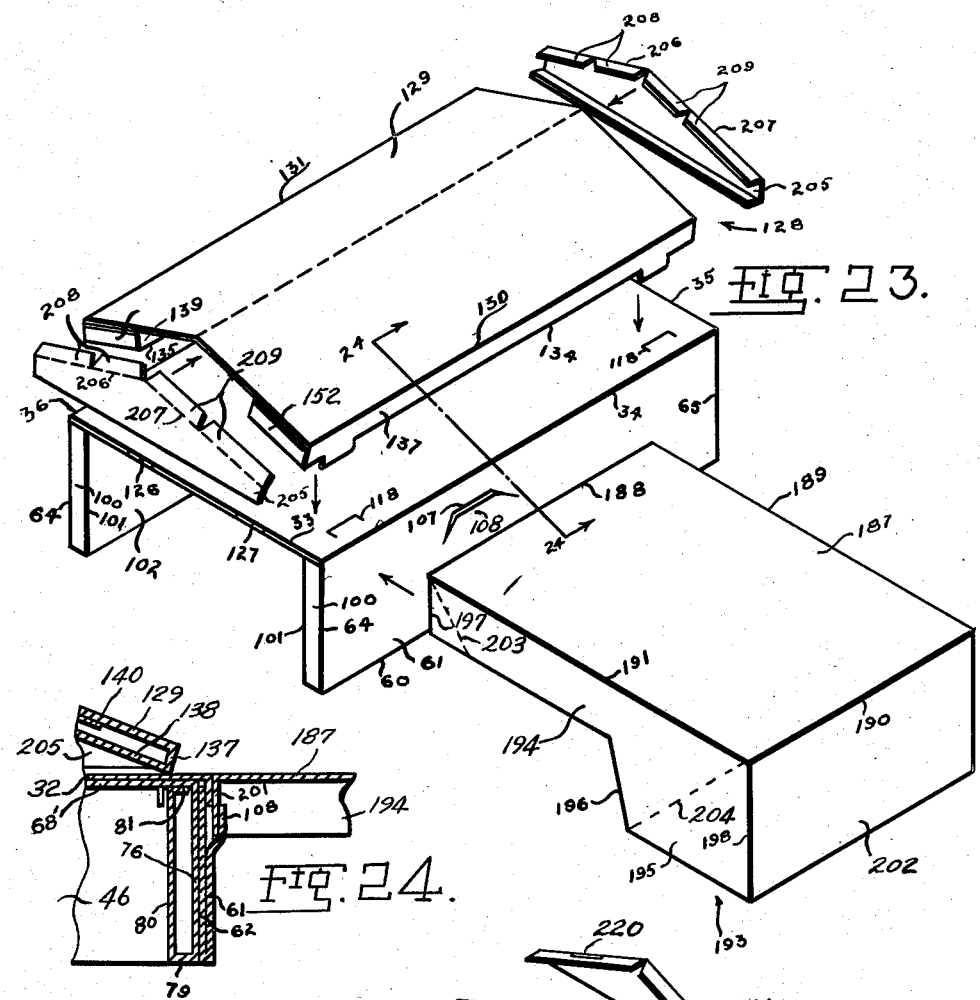
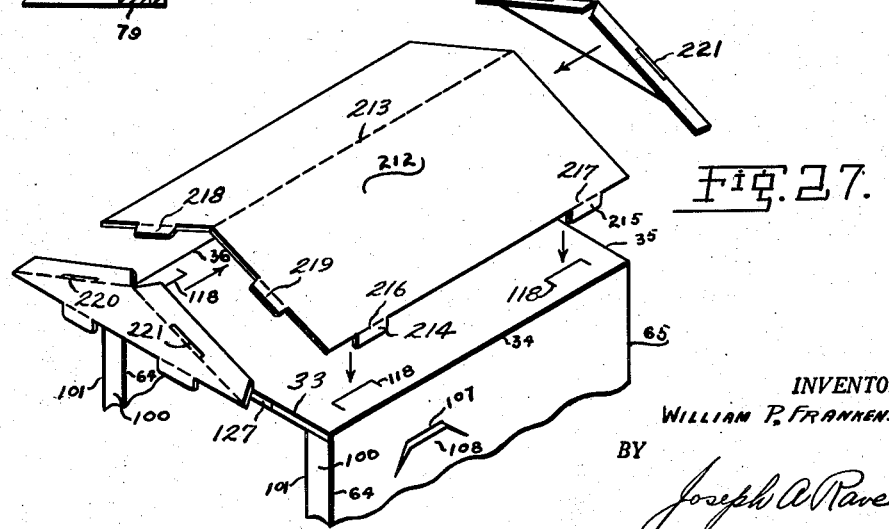
INVENTOR.
WILLIAM P. FRANKENSTEIN
BY
Joseph A. Rave
ATTORNEY

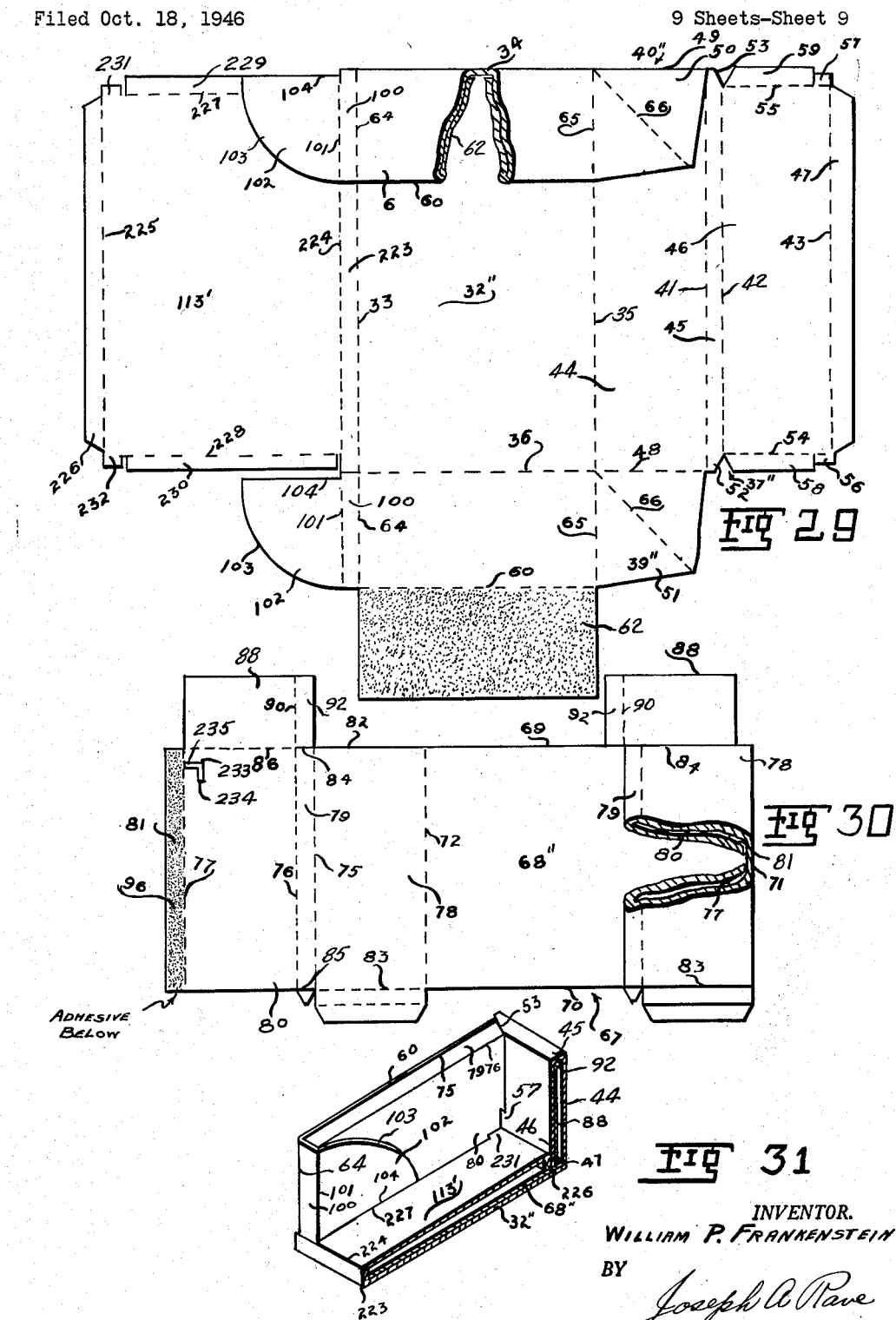

Patented Apr. 7, 1953

2,634,044

UNITED STATES PATENT OFFICE 2,634,044

CARTON

William P. Frankenstein, Cincinnati, Ohio

Application October 18, 1946, Serial No. 703,984

17 Claims. (Cl. 229—31)

This invention relates to improvements in cartons or boxes, and particularly to improvements in "knocked-down cartons," which are shipped to the user in a partially assembled condition.

The principal object of the present invention is the provision of a box or carton, having double or spaced-apart walls, of the nature disclosed in United States Patent Re. 21,158, formed, however, from two blanks instead of from a single blank.

A further object of the present invention is the provision of a box or carton, formed in accordance with the preceding paragraph, that may be used as a shipping container, display package, and subsequently employed as a toy building for housing the goods, usually toys, packed and shipped therein.

A further object of the present invention is the provision of a box or carton assembly, having two or more walls thereof, each of an appreciable width, and wherein one or more of said walls is formed from a blank subsequently tied into the box or carton by a second blank and which second blank provides the necessary remaining walls.

A further object of the present invention is the provision of a box or carton, of the kind set forth in the preceding paragraph, that may be used as a shipping container, display package, and subsequently as a toy building.

A still further object of the present invention is the provision of a box or carton of the kind set forth above, and wherein a platform or filler is utilized together with a cover or lid, and which platform or filler and cover or lid, may be employed with the box or carton to complete the building by adding thereto supplemental building and/or a roof, and/or other building appurtenances.

Other objects and advantages of the present invention will be readily apparent by reference to the following specification considered in conjunction with the accompanying drawings, forming a part thereof, and it is to be understood that any modifications may be made in the exact structural details there shown and described, within the scope of the appended claims, without departing from or exceeding the spirit of the invention.

In the drawings:

Fig. 3 is a perspective view of the erected or set up supplemental box portion from the blank of Fig. 2.

Fig. 4 is a perspective view of the erected carton from the blanks of Figs. 1 and 2.

Fig. 5 is an enlarged transverse sectional view of the erected carton of Fig. 4, as seen from line 5—5 on said Fig. 4.

Fig. 6 is a fragmentary sectional view through a corner of the carton of Fig. 4, taken on line 6—6 on Fig. 5.

Fig. 7 is an extended plan view of a blank similar to that shown in Fig. 1, for forming a three-sided carton or box.

Fig. 8 is an extended plan view of a blank, forming a supplemental portion of the carton to be formed from the blank of Fig. 7.

Fig. 9 is a perspective view of an erected carton formed from the blanks of Figs. 7 and 8.

Fig. 10 is an enlarged fragmentary sectional view of one of the walls of the carton of Fig. 9, as seen from line 10—10 on said Fig. 9.

Fig. 11 is a plan view of an extended blank, to form a platform, or filler, that may be used with the carton of Fig. 9.

Fig. 12 is a plan view of the platform of Fig. 11, folded flat as shipped to the user.

Fig. 13 is a perspective view of the platform of Figs. 11 and 12, in a substantially erected position.

Fig. 14 is a transverse sectional view through the folded platform, as seen from line 14—14 on Fig. 12.

Fig. 15 is a transverse sectional view through the platform of Fig. 13, showing the same supporting goods, toys shipped in the carton, with said view of the platform taken on line 15—15 on Fig. 13.

Fig. 16 is a perspective view of a blank forming a block or positioning member for certain of the tops illustrated in Fig. 15, and forming a detail of the invention.

Fig. 17 is a perspective view of an erected or assembled block showing a modification therein over the block of Fig. 16.

Fig. 18 is a perspective view of a piece that cooperates with the platform of Fig. 13 in forming the roof of the toy building of this invention.

Fig. 19 is a perspective view of a strap utilized in holding certain of the goods in position on the platform.

Fig. 20 is an extended plan view of a blank from which the cover or lid is made for one form of the carton of this invention.

Fig. 21 is a perspective view of the cover or lid in a substantially erected position, and illustrating the method or mood of erecting the same.

Fig. 22 is a longitudinal sectional view through the blank of Fig. 20, after the same has been folded to the position to have applied thereto adhesive, and as seen from line 22—22 on said Fig. 20.

Fig. 23 is a perspective view of the various elements of the carton, platform and cover or lid, showing the same as being assembled into a play or toy building.

Fig. 24 is a fragmentary vertical sectional view through the assembled building partition, as seen from line 24—24 on Fig. 23.

Fig. 25 is a perspective view of a blank, which forms the end of the roof of Fig. 26, and illustrates a modification in this piece over that illustrated in Fig. 18.

Fig. 26 is a perspective plan view of a roof element which could be supplied in place of the platform of Fig. 13 to form the toy building roof when the platform is not required in the package.

Fig. 27 is a perspective view of the modified roof and roof end elements in position for erection with said modified elements taking the place of those illustrated in Fig. 23.

Fig. 28 is a perspective view of the carton and cover, illustrating the same as it is supplied to the ultimate user or consumer.

Fig. 29 is a plan view, similar to Fig. 7 of a blank showing modification in the blank over that of Fig. 7 for forming a slightly modified carton.

Fig. 30 is a plan view, similar to Fig. 8, of a blank for forming the walls of the carton not formed by Fig. 29 and showing a modification therein over the disclosure in said Fig. 1.

Fig. 31 is a perspective sectional view of the blanks of Figs. 29 and 30 assembled in operative positions.

Throughout the several views of the drawings, similar reference characters are employed to denote the same or similar parts.

As was noted above, the chief purpose of the present invention is the provision of a foldable carton or box and herein certain walls thereof are to be of the spaced-apart variety and, therefore, of appreciable width, with said walls, or certain of them, formed in a second blank, which is tied into the first blank, which, in the main, forms the carton or box. It is also an important purpose of this invention to provide a box or carton that, after serving as a shipping container and display package, may be utilized as a miniature or toy building. To fully accomplish the last stated purpose extraneous pieces are supplied, which may, or may not, be necessary to complete the shipping container or display package. To further provide a realistic toy building structure, an especially designed lid or cover is utilized which serves the normal purpose of a cover or lid, during the use of the carton or box as a shipping container, but in addition, acts as an auxiliary or supplemental building to the toy building formed by the carton proper.

Figure 1:
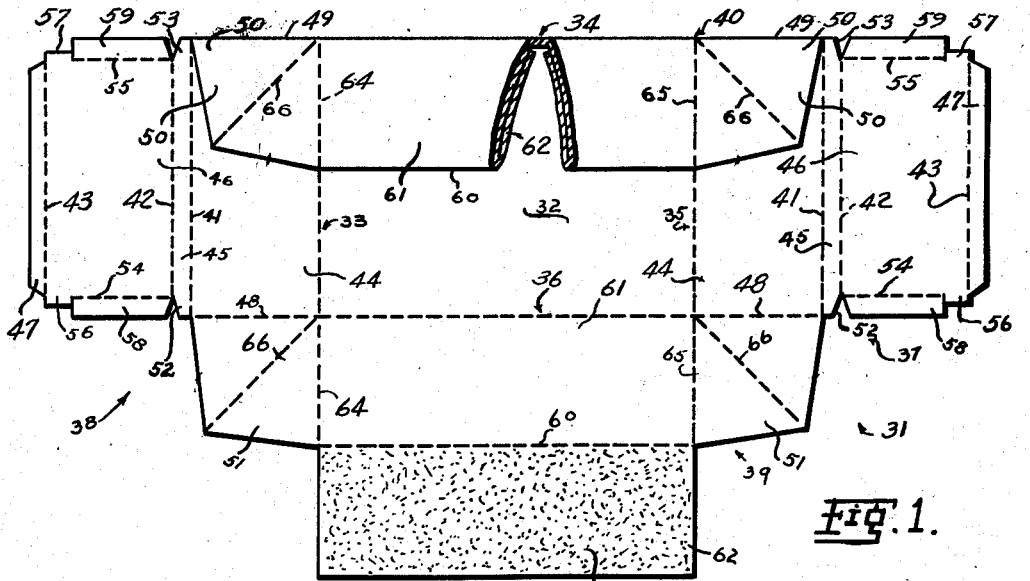
Fig. 1 is an extended plan view of a blank for forming a four-sided carton or box embodying the principles of this invention.

With these and other purposes in view, the carton and associated parts are specifically as follows:

The blank 31, illustrated in Fig. 1, constitutes or forms the main portion of a four-sided carton or box with, in the final assembly, each of said sides formed as spaced-apart hollow walls. The blank 31 comprises a main panel 32, having its sides defined by score or fold lines 33, 34, 35 and 36. Score or fold lines 33 and 35, each, respectively, hingedly connected with the main panel 32, extensions 37 and 38 which, in the erected carton, form the end walls thereof. Similarly score or fold lines 34 and 36 hingedly connect with the panel 32, extensions 39 and 40, which, in the erected carton, form the side walls thereof. It is to be understood that the designation of the walls of the carton as "side" and "end" are merely for convenience, since these terms are interchangeable, the former being generally applied to the longer walls, while the latter terms are generally reserved for the shorter or joining walls.

Since extensions 37 and 38 are substantially duplicates of one another, it is deemed sufficient if but one of them be described in detail. Accordingly, extension 37 is subdivided by a plurality of score or fold lines 41, 42 and 43 into panels 44, 45, 46, and 47. In the erected carton the panel 44 constitutes the end wall outer wall member and has its ends defined by the score or fold lines 48 and 49. The score or fold lines 48 and 49 hingedly connect to the panel 44 corner pieces 50 and 51. The panel 45, in the erected carton constitutes the end wall top wall member and has its ends defined by contoured cut lines 52 and 53, and which cuts perform a dual purpose, namely, a utilitarian purpose and a decorative purpose, as will later be made clear. The panel 46, in the erected carton, constitutes the end wall inner wall member and has its ends defined, in the main, by score or fold lines 54 and 55. It should be noted that the score or fold lines 54 and 55 extend from the inner end or low point of the top wall member contoured cuts 52 and 53 and in effect inset the sides of the end wall inner wall member to fit between the side walls. The panel 46, in addition, has projected from its sides locking lugs 56 and 57, utilized, as will later be made clear, for holding the carton walls in erected positions and for securing the main blank and the supplementary or minor blank, to be subsequently described in the operative relation to one another. The panel 46 has hingedly connected therewith through its side score or fold lines 54 and 55 spacer tabs 58 and 59 which, in the erected carton, space the vertical opposed edges of the wall inner and outer wall members from one another. The remaining panel 47, in the erected carton, constitutes a spacer and overlies the main or bottom panel 32 to space the lower sides of the end wall panels 44 and 46 from one another.

Side wall extensions 39 and 40 are substantially duplicates of one another and it is deemed sufficient if but one of said extensions is described in detail. Accordingly, extension 39 is subdivided by a score or fold line 60 into panels 61 and 62. Said panels 61 and 62 are to be superimposed on one another and secured in this position. In order to accomplish this, the panel 62 has applied thereto adhesive, indicated in Fig. 1, by the reference numeral 63 which, upon folding the panel 62 on the score line 60, is brought into engagement with the panel 61 and subjected to pressure for effecting an adherence of said panels to one another. The ends of the panel 61 are defined by score or fold lines 64 and 65 which relatively hingedly connect the corner pieces 50 and 51, respectively, to the ends of panel 61.

Each of the corner pieces 50 and 51 is substantially identical with the other and form in the erected carton, what is commercially known as, a bellows corner. For this purpose, each of said corner pieces is provided with a diagonal fold or line 66.

After the blank 31 is cut and scored as above described, the adhesive is applied to the panels whereupon, as above set forth, the said panels 62 are folded on their score or fold lines 60 to be brought into engagement with the panel 61. It is in this folded and secured position of the parts that the carton is shipped to the ultimate user. The user, upon desiring to use the same, will set up the carton in a manner to be later described.

As will later be made clear, the blank 31 sets up to provide a carton having hollow or spaced apart end walls. With this carton and to provide spaced apart or hollow side walls, use is to be made of the blank Fig. 2, which is now to be described in detail.

Figure 2:
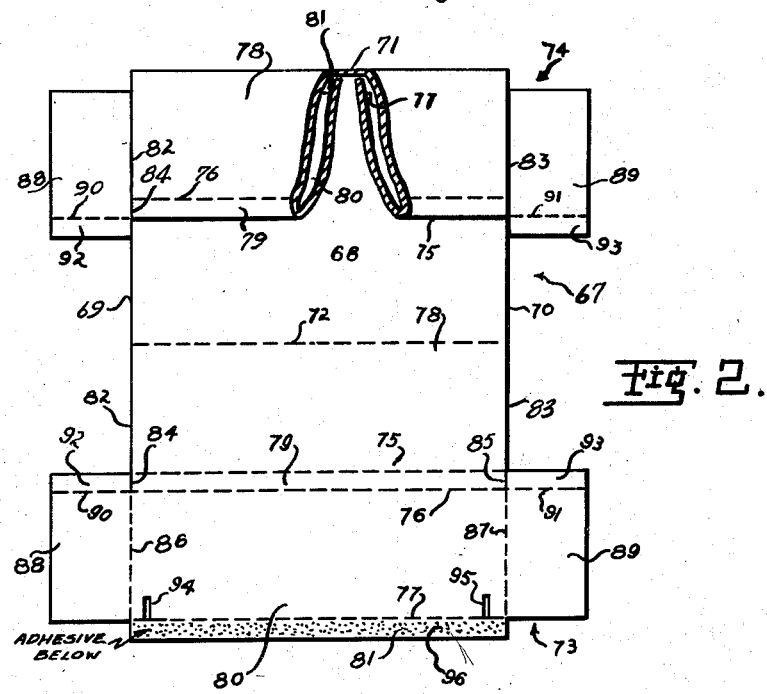
Fig. 2 is an extended plan view of a blank for forming supplemental walls in the carton formed from the blank of Fig. 1.

The said blank Fig. 2 may be referred to as the auxiliary or minor or side wall blank and is indicated in general in Fig. 2 by the reference numeral 67. This blank 67 comprises a main panel portion 68 of an area substantially equal to the area of the main panel or bottom 32 of the blank 31 except that the panel 68 may be reduced in area an amount equal to the thickness of the cardboard or other material from which the blanks 31 and 67 are formed. The panel 68 has, in the nomenclature applied to blank 31, its ends defined by cut lines 69 and 70, and its sides defined by score or fold lines 71 and 72. The score or fold lines 71 and 72 hingedly connect to the panel 68, extensions 73 and 74, which are substantially duplicates of one another, wherefore, it is deemed sufficient if but one of them be described in detail.

Accordingly, extension 73 is subdivided by a plurality of score or fold lines 75, 76, and 77 into a plurality of panels 78, 79, 80 and 81. Upon erection of the blank 67, per se, the panel 78 constitutes the side wall, outer wall member while, when connected with the blank 31 constitutes a side wall intermediate wall member and has its ends defined by cut lines 82 and 83, which are in alignment with the ends 69 and 70 of the panel 68. In the erected condition of blank 67, the panel 79 constitutes a side wall top wall member whose ends are defined by cut lines 84 and 85 in alignment with the cut lines 82 and 83. The panel 80 in the erected carton constitutes the side wall inner wall member, and has its ends defined by score or fold lines 86 and 87, which are in alignment with the cut lines 84 and 85. The score or fold lines 86 and 87 respectively hingedly connected with the ends of the panel 80, tucking flaps 88 and 89 of a height equal to that of the panel 80, with their end lines defined, respectively, by score or fold lines 90 and 91 respectively hingedly connecting with the tucking flaps 88 and 89, spacer flaps 92 and 93. Formed within the panel 80, adjacent to the outer corner thereof are elongated apertures 94 and 95, which cooperate with the end wall locking lugs 56 and 57 of the blank 31 in holding the carton walls in erected positions as well as holding or securing the blanks 31 and 67 to one another. The remaining panel 81 is a glue flap, and has applied to the undersurface thereof, as seen in Fig. 2, suitable adhesive, indicated in the drawing by the reference numeral 96.

After the blank 67 has been cut and scored, as just described, it is passed through an undershot glue pot, or the glue flap 81 and panel 80 are folded as a unit on the score or fold line 76 to be imposed on the panel 78 and expose the undersurface of said panel 81 in order to have the adhesive 96 applied thereto. The panel 78, and 79 with the superimposed panels 80 and 81, are then folded on the score or fold line 72 to bring the adhesive 96 into contact with the panel 68, whereupon each extension 73 and 74 is in the position of the panel 74, illustrated in Fig. 2. It is in this condition that the blank 67 is shipped to the user to be opened and erected by him along with the opening and erection of the blank 31.

When the user desires to set up the carton just described, he opens up the blank of Fig. 2 to have the side walls inner and outer wall members 78 and 80 normal with the bottom panel 68 which automatically arranges the side wall top wall members 79 parallel with said bottom panel 68. The tucking flaps 88 and 89 are then arranged to be transversely of the bottom panel 68 with their respectively spacing panels 92 and 93 inwardly disposed and parallel with the bottom panel 68. The blank 67 is then in the position of erection as illustrated in Fig. 3, particularly the upper end of said Fig. 3.

The blank 31 of Fig. 1 is then erected to the extent of having the side wall thereof raised to be upstanding with respect to the bottom panel 32 and with the extensions 37 and 38 outwardly disposed and parallel with the bottom. The blank is then in the position as illustrated by the lower end of Fig. 4, whereupon the erected blank of Fig. 3 is placed within the partially erected blank 31 with the bottom panel 68 on the bottom panel 32 and substantially coincides therewith and with the side walls outer members 78 in face contact with the inner wall member 62 of the main blank 31.

With each of the blanks in their partially erected position and nested within one another the end walls, formed from extensions 37 and 38 now folded, or erected to their operative positions. This erection of the said extensions 37 and 38 is effected by raising the same or their score or fold lines 33 and 35 which disposes the end walls outer wall members normal to the bottom panel 32, and automatically effects the folding of corner pieces 50 and 51 on themselves their diagonal fold lines 66 to dispose said corner pieces substantially transversely of the bottom panel 32. In this position the corner pieces 50 and 51 are in face contact with the tucking flaps 88 and 89 of the supplemental or minor blank 67. Continued erection of the end wall extensions 37 and 38 consists in disposing the spacing flaps 58 and 59 as well as the spacing flaps 47, to be normal to the end walls inner wall members 46 whereupon the panels 45 and 46 are folded to be respectively parallel and normal with the bottom panel 32 and end walls outer wall members 44 with the spacing flaps 47, 58 and 59 between and spacing said inner and outer end wall members 44 and 46 from one another. The final folding or positioning of the end walls inner wall members 46 causes the locking lugs 56 and 57 thereof to enter the slits 94 and 95 of supplemental or minor blank 67 side walls inner wall members 80 and they then lock the parts in erected positions.

From the foregoing it will be appreciated that there has been provided a four-sided box or carton with each side or wall of double or spaced apart construction, with two of said walls formed integral with the main blank and the remaining two of said walls formed integral with the supplemental or minor blank.

In the modified carton illustrated in Figs. 7, 8 and 9 use is made of but three walls, instead of four with the fourth wall removed to provide an open end and which open end forms the entrance or doorway to the carton when it is employed as a toy building.

The main blank 97 of the modified form of Fig. 7 is substantially identical with that of Fig. 1 in so far as providing a main or bottom panel 32' from which extends side wall extensions 39' and 40'. In addition the blank 97 has the one end wall extension 31 which is identical with that of Fig. 1 having a radically modified fourth extension 98 which will be here and after specifically described.

The side wall extension 39' is modified over that of Fig. 1 to the extent that the adhesive 63 does not extend for the full width of the panel 62 but stops short of the score or fold line 60 thereby providing a space 99 free of adhesive. A further modification on these extensions is that the inner wall panel 61 instead of connecting a corner piece to one end thereof through the score of fold line 64 hingedly connects therewith a panel 100 which in turn through a score or fold line 101 has hingedly connected thereto a locking tab 102. The locking tab 102 is illustrated in the drawings as having an arcuate or contoured edge 103 which is for decorative purpose as much as for utilitarian purpose. The locking tab 102 is provided with a score or fold line 104 whereby it has hingedly connected thereto a hold-down tab 105, in the body of which hold-down tab is a slit or cut-out 106.

The only difference or modification in extension 40' over the extension 39' in addition to that just described in connection with extension 39', is that the outer wall member panel 62 is provided with a substantially keystone shape cut 107, thereby providing a tongue 108 within the said panel 62 which is utilized for securing to the main carton an auxiliary play building or building portion.

The inner wall member panels 62 of the extensions 39' and 40' in addition have their one end partially defined by a score or fold line 109 for hingedly connecting thereto a panel 110 of a width substantially equal to the width of panel 100. The outer side of the panel 110 is defined by score or fold line 111 for hingedly connecting therewith a tucking flap 112.

The extension flap 98 is connected with the bottom panel 32' through the score or fold line 33 and constitutes a locking panel 113 for completing the locking of the parts to one another as will later be made clear. The locking panel 113 is therefore provided with projecting locking lugs 114 and 115 and in addition is provided with cutout portions 116 and 117, the former of which is illustrated in Fig. 9, while the latter is illustrated in Fig. 7. The cutouts 116 and 117 are respectively arranged to coincide with a U-shaped slit or cuts 118, one of which slits or cuts is provided in each corner of the bottom panel 32'.

To be employed with the modified blank of Fig. 7 is the blank of Fig. 8, which is slightly modified over that of Fig. 2 and indicated by the reference numeral 73'. The chief modification of the blank 73' is that its bottom panel 68' is provided adjacent its corners with apertures 119 to coincide with the U-shaped slits, or cuts 118 of the blank bottom panel 32' and to be superimposed upon one another upon the assembly of blanks 97 and 73'. The blank 73' in addition, has eliminated from one end of its inner wall members the tucking flap 88 and spacing flap 92. Instead of these elements the inner wall member panel 80 has connected therewith, through the score or fold line 86, a panel 120 whose other side is defined by score or fold line 121. The score or fold line 121 hingedly connects to the panel 120 a tucking flap 122. In the modified blank 73' the end of the side wall top wall panel 79, defined by cut line 84 in the blank 73, is changed to a score or fold line 123 for hingedly connecting thereto a bendable tab 124.

After each of the blanks 97 and 73' of Figs. 7 and 8 is cut and scored as just defined, adhesive 63 and 96 is applied thereto whereupon their extensions which form the side wall are folded to the positions illustrated by the upper extension thereof. It is in this position that the said blanks are shipped to the user.

The user upon desiring to erect the carton follows the same steps as above outlined in connection with the erection of the blanks of Figs. 3 and 4, except that the open end of the modified carton has its locking panel arranged to be superimposed on the panel 68' of the supplemental or minor blanks 73'.

This erection of the open end of the modified carton consists in first turning down the bendable tabs 124 and then arranging the panels 120 to close the ends of the side walls of the supplemental blank 73' whereupon the tucking flaps 122 are inserted to be within the interior of their respective hollow side walls. The panels 110 of the blank 97 are then arranged to have their panels 100 superimposed on panels 110 with themselves in face contact with the tabs 112 and side wall inner wall members or panels 80. Prior to the arranging of the locking tabs 102 their hold down flanges 105 were bent to be disposed outwardly thereof and are now superimposed on the supplemental or minor blank bottom panel 68'. The locking panel 113 is now actuated about the score or fold line 33 to be superimposed on the hold down flanges 105 and minor blank bottom panel 68. In order to retain the parts in this position the hold down panel locking lugs 114 and 115 are respectively inserted into slits 125 formed in the wall member panels 80 at the bottoms thereof, namely, adjacent to the score of fold lines 77. It should be here noted that the slits 125 take the place of the slits 94 of Fig. 2 for erecting the open end of the modified carton.

In addition to the modifications previously described, in Figs. 7 and 8, the said blank 97 is provided, along its fold or score line 33 with slits 126 and 127 both of which are shown in Fig. 9, while the latter only is shown in Fig. 7. The purpose of these slits, as will later be made clear, is for the attachment of auxiliary pieces to form the roof of a toy or play building.

To be utilized with the carton of Fig. 9, when the merchandise to be packed therein justifies same, is a platform illustrated in Figs. 11 to 14 inclusive. This platform is formed of a substantially rectangular piece of paper or cardboard material and is indicated in general by the reference numeral 128. The blank 128 has a central or main panel 129 of an area substantially coextensive with that of the supplemental or minor blank carton bottom panel 68 between the inner wall members when set up. Two opposite sides of the panel 129 are defined by score or fold lines 130 and 131 which respectively hingedly connect thereto similar extensions 132 and 133, which are substantially identical and it is considered sufficient if but one of them be described in detail.

The extension 123 is subdivided by a plurality of score or fold lines 134, 135 and 136 into a plurality of panels 137, 138, 139 and 140. These panels 137 to 140 inclusive are adapted to be disposed normal to one another thereby providing upstanding tubular portions along the sides of the platform main panel as clearly illustrated in Figs. 13 and 15.

The panel 137 which in the erected platform forms the tubular outer wall member has its ends defined by score or fold lines 141 and 142 which respectively hingedly connect to the panel 137 tabs 143 and 144 which cooperate in holding the tubular portions in operative position. The panel 139 forms in the erected platform the inner wall member of the tube and like the panel 137 has its ends defined by score or fold lines 145 and 146 again respectively hingedly concenting to the panel 139, tabs 147 and 148 which serve a similar function as the tabs 143 and 144. Intermediate the score or fold lines 145 and 146 the panel 139 is provided with a transverse perforation 149 which is adapted to receive and position a block for the goods in the carton and on the platform as will later be made clear.

The panel 138, which in the erected platform constitutes the top of the tubular portion has its ends defined by score or fold lines 150 and 151 which hingedly connect to the panel 138 tube closing panels 152 and 153 each provided with a score or fold line 154 and 155 to form therein the closure member and the tucking flap which holds the tubular portion of the platform erected. Intermediate the score or fold lines 150 and 151 the panel 138 is provided with spaced cutouts or apertures 156 which may conveniently consist of a single cut 157 with right angle cuts 158 and 159 at their ends thereby providing flaps which may be bent or depressed, respectively, on score or fold lines 160 and 161. These cutouts or apertures 156 are so spaced as to receive portions of articles packed or disposed on the platform and act as positioning means therefore. The panel 138 is further provided near its ends and extending outwardly from the score or fold line 134 with U-shaped slits 162 and 163 thereby providing, when the platform is erected, lugs 164 and 165 which upstand from the platform tubes as illustrated most clearly in Fig. 13. The panel 138 of the extension 133 is further provided, in operative relation with the apertures 156, with longitudinally extending apertures 166 which are utilized for receiving a tie member for tying or anchoring the goods to the platform as will later be made clear.

After the platform blank 128 has been cut and scored as above described the flap 140 is folded on the score or fold line 136 and adhesive 167 applied thereto unless said adhesive was previously applied by an undershot gluepot during the formation of the blank 128. The extensions 132 and 133 are then respectively folded on the score or fold lines 130 and 131 to bring the adhesive 167 of each glue flap 140 into contact with the platform body portion 129 whereupon the blank is in the position illustrated in Figs. 12 and 14 and ready for shipment to the user. It will be appreciated that the tubular portions of the platform are folded flat onto the platform body portion 129 as most clearly illustrated in section on Fig. 14.

It should be noted that during the formation of the platform blank 128 its body portion 129 was provided centrally thereof with a score or fold line 168 which, as will later be made clear, is employed in arranging or assembling the parts for use as a toy or play building.

The user sets up the platform by raising the tubular side portions thereof to have their inner and outer members 137 and 139 normal to the body portion 129 whereupon the tabs, 144 and 148, for example, are disposed toward one another transversely of the tubes and the closure flap 153 arranged to close the end of the tube and held in position by inserting the tucking portion thereof beneath the tabs 144 and 148 into the tube proper. The other end of the tube is then similarly closed by disposing tabs 143 and 147 toward one another and enclosed by the closure flap 152.

In the particular example illustrated in the drawings the platform tubes are respectively adapted to support toy or miniature automobiles and trucks while the portion of the platform body 129 between said tubes is adapted to support a relatively long trailer on which the toy or miniature automobiles and trucks may be mounted. The said toy or miniature automobiles and trucks are positioned on the platform tubes by having their wheels inserted within the apertures 156 in the tube top portions 138 and which apertures 156 are positioned to receive said wheels.

It will be appreciated that the height of the several toys, if made in proportions to their prototypes, are dissimilar and, as will later appear, certain of these toys will be held against displacement on the platform by the carton cover or lid while others being shorter require anchoring or tie means. This last mentioned condition exists with respect to the toy or miniature automobile 169 wherefore use is made of a band 170 to hold same in position. The band 170 is illustrated in Fig. 19 and is cut from paper or cardboard stock and comprises a central relatively narrow elongated body portion 171 having projecting from each side thereof at its ends ears 172 and 173. The said ears 172 and 173 are adapted to be projected through the apertures 166 in the platform tube top 138 and engaging the under surface of said platform top at each end of the apertures 166. In order that the said ears 172 and 173 may be readily inserted through said apertures 166 they are connected with the band body portion by score or fold lines 174 whereby they may be folded onto the band prior to insertion through said apertures and then open out to their operative engaging positions.

The toy or miniature automobile 169 and the toy or miniature truck 175 are held against axial movement by the cooperation of the apertures 156 and the wheels of the said toys. The toy or miniature trailer 176 however has no means for engaging its wheels to prohibit this axial movement thereof. In order, therefore, to hold the trailer 176 from axial movement use is made of a blank 177 transversely of the platform and adapted to engage a projection 178 below said trailer 176. The block 177 is cut or died from paper or cardboard stock as a blank illustrated in Fig. 16 and is symmetrical on each side of its longitudinal center.

This block blank is therefore provided centrally with a score or fold line 179 having on each side thereof panels 180 and 181 separated from one another by a score or fold line 182. Each of the panels 180 is of greater length than its adjacent panel 181 thereby providing ears 183 and 184 beyond the panel 181.

The blank is folded as illustrated in connection with the modified block of Fig. 17 on its central score or fold line 179 thereby bringing the under surfaces of panels 180 into contact with one another whereupon the panels 181 are folded outwardly to be normal to the panels 180 whereby the ears 183 and 184 project beyond said panels 181. The block is mounted in operative positions by inserting the ears 183 and 184 into the aligned and opposed vertical apertures 143 in the tubular inner wall members 139.

The modified block in Fig. 17 is modified to the extent that a diamond shaped cutout is formed substantially centrally of the panels 180 which when erected form the V-shaped notch 185. Extending transversely of the panels 181 from the apex of the notch 185 are score or fold lines 186. The purpose for this construction is, as will later be made clear, to permit the block to remain in assembled position on the platform when the said platform is utilized as the roof for the play or toy building.

To utilize the carton of Fig. 9 with its assembled platform of Figs. 13 and 15 as a shipping container a cover or lid as illustrated in Figs. 20, 21 and 22 is employed. The said cover or lid, as pointed out above, is further utilized as a part of or as an auxiliary to the carton in forming the toy or play building and while its general construction is not novel it does involve novel features and is formed from a single blank of cardboard illustrated in plan in Fig. 20.

The cover comprises a main or top panel 187 bounded by score or fold lines 188, 189, 190 and 191. The score or fold lines 189 and 191 respectively hingedly connect to the top panel 187 extension panels 192 and 193 which are identical and it is therefore deemed sufficient if but one of them be described in detail. The extension 193 is in the form of a panel having a narrow portion 194 and a wider portion 195 connected to one another by an inclined line 196. It should be noted that the line 196 while illustrated and described as an inclined line may be arcuately or otherwise shaped so long as there is a connection between the narrower portion 194 and the wider portion 195. It should further be noted that the width of the wider portion 195 is equal to the full height of the carton side with which it is to be used namely the side walls of the carton of Fig. 9. The ends of the extension 193 are defined by score or fold lines 197 and 198 which respectively hingedly connect to the said extension panel glue flaps 199 and 200.

The remaining score or fold lines 188 and 190 of the cover panel 187 respectively hingedly connect thereto panels 201 and 202 which are respectively of a width equal to the width of the ends of the side panels adjacent thereto.

The extension panels 192 and 193 are each provided near their opposite ends with diagonal score or fold lines 203 and 204 thereby providing a triangular portion at said ends of the extension panels.

After the blank has been cut and scored the panel extensions 192 and 193 are respectively folded on their score or fold lines 189 and 191 to be face contact with the cover top panel 187 whereupon the triangular portions at the ends of said panels are folded back onto the panels on their score lines 203 and 204. The glue flaps 199 and 200 are now folded on their respective score or fold lines 197 and 198 onto the now exposed surface of the panel extensions triangular portions. The said panels 192 and 193 are now in the position illustrated in phantom lines in Fig. 20. Adhesive is now applied to the exposed surfaces of the glue flaps 199 and 200 unless the adhesive were applied prior to the folding of said extension panels. The flaps or cover end flanges 201 and 202 are now folded onto the cover panel 187 and glue flaps 199 and 200 and pressure applied to effect an adhesion of said panels and glue flaps. The parts are now in the position illustrated in cross section in Fig. 22 and it is in this position that the cover is shipped to the user.

The user upon desiring to set up the lid or cover for use merely lifts the cover end flanges 201 and 202 to be upstanding or normal to the cover top panel 187. This movement of the said end flanges 201 and 202 automatically raises the cover side flanges or extension panels 192 and 193 to be in the position illustrated in Fig. 21. As illustrated in said Fig. 21 the cover end flanges are shown as having one end thereof normal to the cover top panel 187 as is the extension flange 193 while the opposite extension flange 192 is illustrated as in the act of being made normal to the cover top panel 187 by arranging the remaining corner of said end flanges 201 and 202 in this position.

It will now be appreciated that there has been provided a box or carton proper from two blanks which has two hollow upstanding side walls and an end or back wall with no other end or front wall. There has also been provided a platform to be received in the carton proper and on which is to be mounted goods such as toy wheeled vehicles together with means for securing at least certain of said toys against displacement. The cover is illustrated as having one end deep enough to completely close the open end of the box or carton so that when it is mounted in position a completely enclosed carton is provided to prevent inadvertent loss or removal of the toys from the package. Fig. 28 illustrates the carton with its platform therein together with a cover in position to be applied to the carton and further illustrated, in phantom lines, the cover as enclosing the carton proper.

It should be noted that with the cover or lid as disclosed in this application the outer surface of the end wall or back of the carton may contain suitable indicia indicative of the contents of the carton which need not be repeated on the lid or cover since said indicia can readily be observed and read since it is not obscured by the cover flange at that end of the carton or box.

Upon removal of the goods, toys, from the carton or box the parts thereof previously described may be rearranged to form the play or toy building with which the said goods, toys, of the carton may be utilized. The rearrangement of the parts is illustrated in Figs. 23 and 24 where the carton or box proper is shown as inverted and resting, on the carton side walls top wall members 79 of the minor blank 73' and end wall top wall member 45 of the major or main blank 97 with the bottom of said blanks acting as the ceiling and the open front end of the carton being the doorway into the building. The platform 128 has the block 177 removed, unless the block of Fig. 17 were employed, whereupon it is folded, slightly on its central score line 168 to form a peaked roof with the lugs 164 and 165 depending therefrom. The said lugs 164 and 165 are inserted into the slits caused by the U-shaped cuts 118 in the carton bottom panel 32'. Since, and as noted above, the locking panel 113 is provided with cutouts or recesses 117 and 118, the locking flanges with slits 106 and the minor blank with cutouts 119, all of which correspond with the slits 118 no interference to the insertion of the lugs 164 and 165 is encountered.

In order that the roof may be completed there is included in the package, the roof end illustrated in Fig. 18. The roof ends are formed of paper or cardboard material and comprises a substantially rectangular body portion 205 provided with inclined score or fold lines 206 and 207 which respectively hingedly connect to the body portion a pair of tabs 208 and 209. Projecting from the lower end of the body portion 205 are lugs 210 and 211.

To complete the roof assembly in Fig. 23 the various tabs and lugs 208 to 211 are bent to be substantially normal to the body portion 205 whereupon the outermost tabs of each pair 208 and 209 is inserted into the platform tubes while the remaining tab of each of said pairs is disposed beneath the roof within the space between said tubes. The ears or lugs 210 and 211 are inserted into the apertures 126 and 127 to lie between the carton bottoms 32 and 32' of the main and minor blanks 31 and 31' respectively.

The lid or cover is now, similar to the carton proper, turned to rest on the lower edge of the wider portions 195 of the extension panels 192 and 193. The end flange 199, the shorter of the end flanges, is now hooked behind the keystone shaped lug or flap 108 in the adjacent outer wall member of the main blank of the carton proper. With the parts in this position the portion of the top or cover extension flanges 192 and 193 which extends from the inclined cut 196 acts as an extension of the main building or as an auxiliary building connected with the main building. The interlocking of the carton and cover as a building and the securing of the roof thereof is illustrated in cross section in Fig. 24.

It is to be understood that the exposed surfaces of the carton proper, the cover or lid, the platform, and the roof end pieces are each properly and appropriately lithographed or printed to represent an appropriate building for the toys originally shipped and displayed in the carton. In other words, and assuming that the goods were the toy wheeled vehicles illustrated in Fig. 15, the parts of the carton and lid would be lithographed or printed to illustrate a garage and a filling station or service station with which the said toy wheeled vehicles may be appropriately used. It is to be understood that if the goods within the box or carton were of some other nature, such for example as toy or miniature airplanes, the carton and other parts may appropriately be lithographed or printed as an airplane hangar together with a service garage, operations office, or the like.

In the event that a platform or filler is not required to properly pack the goods therein a roof and roof ends may be supplied as extraneous pieces such for example as illustrated in Figs. 25 and 26 where each is formed of a single thickness material. The roof part, Fig. 26, is merely a rectangular piece of card or paper board material 212 having substantially centrally thereof a score or fold line 213 which will form the ridge of the roof. Extending from each of the longitudinal sides of the roof piece 212 are lugs 214 and 215 connected with the roof 212 through score or fold lines 216 and 217. By this construction the said lugs 214 and 215 may be bent downwardly for insertion in the slits 118. Extending from each of the remaining edges of the roof body portion 212 are lugs 218 and 219 which cooperate with the roof ends in securing the parts in proper position.

The roof ends as illustrated in Fig. 25 are quite similar to those illustrated in Fig. 18 except that instead of having tabs 208 and 209 to be inserted within the platform tubes they are provided instead with elongated apertures 220 and 221 respectively receiving the ears or lugs 218 and 219 of the roof 179.

The assembly of these modified parts is clearly illustrated in Fig. 27 with the result of a toy building substantially similar to that above described and illustrated in Fig. 23.

Instead of having a relatively short locking flange or panel 113 it may be desirable to have a double thickness bottom for the carton minor blank throughout its length and to accomplish this the said locking flange 113 is extended as shown in Fig. 7 in phantom lines at 222. In other words the locking panel 113 would be formed of a length substantially equal to the length of the carton minor blank bottom 68' and of a width substantially equal to the width of said bottom between the inner wall members 80. It will also be appreciated that the said extension would be provided with cutouts and recesses to coincide with the slits 118 at the corners of the carton bottom 32' remote from the score or fold line 33.

The foregoing description deals with a three sided box or carton, formed of a major and a minor blank, with which is to be employed a separate filler or platform. In the event it is desired that the platform be formed integral with the composite box or carton, the said platform may be formed from an extension of the locking flap or panel 113. Such a construction is illustrated in Figs. 29, 30 and 31.

The said modification is illustrated as having one of the longer sides removed and therefore involves a slight rearrangement of the remaining walls. Accordingly the blank of Fig. 29 has connected with its bottom panel 32" through the score or fold lines 33 and 35 substantially identical extensions 39" and 40". As will be noted these extensions 39" and 40" are substantially identical with the extensions 39' and 40' of Fig. 7 and connected to the bottom panel 32' of said Fig. 7 through the score or fold lines 34 and 36. Likewise the blank of Fig. 29 has connected to its bottom panel 32' through the score or fold lines 34 an extension 37" similar in all respects to the end wall extension 37 of Fig. 1 and end wall extension 37' of Fig. 7.

The only other modification in the blank of Fig. 29 over that of Fig. 7 is that the locking panel 113' is made of an area substantially equal to the area of the bottom panel 32" and there is further provided between the hinge or fold line 36 and the said locking panel 113' a bottom front wall panel 223 which has its other side defined by score or fold line 224. The other or outermost side of the locking panel 113' is defined by fold or score line 225 which hingedly connects to the locking flap or panel 113' a spacer flap 226. These sides of the locking flap or panel 113' are defined by score or fold lines 227 and 228 which, respectively, hingedly connect to the sides of the locking panel 113' spacer flaps 229 and 230. In addition, and near the outer ends thereof, the locking panel 113' is provided with locking lugs 231 and 232 which take the place of the locking lugs 114 and 115 disclosed in Fig. 7.

The modified blank disclosed in Fig. 30 includes merely the formation in one corner of its inner wall member 80, of an L-shaped slit 232 having the horizontal portion 234 thereof taking the place of the slit 125 in Fig. 8 and having the vertical portion 235 thereof taking the place of the corresponding vertical slit 95 in said Fig. 8.

The blank of Figs. 29 and 30 are shipped to the user with certain of their walls partially assembled, such as respectively shown at the upper end of Fig. 2 and the right hand end of Fig. 30. The user upon desiring to erect the carton follows the same steps as above set forth in connection with the blanks of Figs. 1 and 2 and Figs. 7 and 8. The only variation in this procedure consisting in upwardly bending the spacing flaps 226, 229 and 230 to be normal to the locking flap or panel 113' prior to its positioning in the locking position. By this construction there is provided an integral platform as shown in Fig. 31 with the locking flap or panel 113' acting as the platform and upwardly spaced from the bottom of the carton.

What is claimed is:

1. In a carton of the class described formed from a main and a minor blank, the main blank having a bottom panel with hingedly connected extensions from the sides thereof and which extensions when erected form a carton having side and end walls and provide the exposed external surfaces of said carton side and end walls, each wall comprising an inner and an outer wall member, certain of said walls having the inner and outer wall members thereof spaced from one another an appreciable distance with a top wall member between them, a pair of opposite walls of said walls are devoid of a spacing top wall member and have their inner and outer wall members in direct contact, the minor blank having a bottom panel superimposed on the bottom panel of the main blank with extensions from two sides thereof to form walls on said minor blank each of an inner and and an outer wall member spaced from one another with a top wall between them, said minor blank walls being adjacent to the main blank walls devoid of a top wall member and inwardly of the said walls of the main blank to provide the exposed inner surface of the carton walls thus formed, and cooperating means on each of said blanks locking them in operative positions to one another upon erection.

2. In a carton of the class described formed from a main and a minor blank, the main blank having a bottom panel with hingedly connected extensions from the sides thereof and which extensions when erected form a carton having side and end walls and provide the exposed external surfaces of said carton side and end walls, each wall comprising an inner and an outer wall member, certain of said walls having the inner and outer wall members thereof spaced from one another an appreciable distance with a top wall member between them a pair of opposite walls of said walls are devoid of a spacing top wall member and have their inner and outer wall members in direct contact, the minor blank having a bottom panel superimposed on the bottom panel of the main blank with extensions from two sides thereof to form walls on said minor blank each of an inner and an outer wall member spaced from one another with a top wall between them, said minor blank walls being adjacent to the main blank walls devoid of a top wall member and inwardly of the said walls of the main blank to provide the exposed inner surface of the carton walls thus formed, and cooperation means on each of said blanks locking them in operative positions to one another upon erection, comprising tucking flaps from the ends of the side walls inner wall members of the minor blank enfolded between the main blank end walls inner and outer wall members, and spacing flaps on said tucking flaps underlying the end wall top walls members for spacing the end wall inner and outer wall member from one another.

3. In a carton of the class described formed from a main and a minor blank, the main blank having a bottom panel with hingedly connected extensions from the sides thereof and which extensions when erected form a carton having side and end walls and provide the exposed external surfaces of said carton side and end walls. each wall comprising an inner and an outer wall member, certain of said walls having the inner and outer wall members thereof spaced from one another an appreciable distance with a top wall between them, a pair of opposite walls of said walls are devoid of a spacing top wall member and have their inner and outer wall members in direct contact, the minor blank having a bottom panel superimposed on the bottom panel of the main blank with extensions from two sides thereof to form walls on said minor blank each of an inner and an outer wall member spaced from one another with a top wall between them, said minor blank walls being adjacent to the main blank walls devoid of a top wall member and inwardly of the said walls of the main blank to provide the exposed inner surface of the carton walls thus formed, cooperating means on each of said blanks locking them in operative position to one another upon erection, comprising tucking flaps from the ends of the side walls inner wall members of the minor blank enfolded between the main blank end walls inner and outer wall members, spacing flaps on said tucking flaps underlying the end walls top wall members for spacing the end walls inner and outer wall members from one another, locking lugs projecting from the sides of said end walls inner wall members, and said side walls inner wall members of the minor blank having slits therein to receive the end walls inner wall members locking lugs.

4. In a device of the class described formed from a main and a minor blank, said main blank comprising a bottom panel having hingedly connected with each of three sides thereof an extension which when erected form opposed side walls with an end wall to one end of the side walls, the minor blank having a bottom panel superimposed on the bottom panel of the main blank, said minor blank bottom panel having extension from two opposed sides thereof to form side walls in the erected carton with each side wall including an inner and an outer wall member spaced from one another with a top wall member therebetween, tucking flaps from the ends of the minor blank side walls adapted to be enfolded between the main blank end wall inner and outer members, and a locking panel hingedly connected to and extending from the remaining edge of the main blank bottom panel folded onto the minor blank bottom panel and thereby securing the blanks to one another upon erection of the carton.

5. In a device of the class described formed from a main and a minor blank, said main blank comprising a bottom panel having hingedly connected with each of three sides thereof an extension which when erected form opposed side walls with an end wall at one end of the side walls, the minor blank having a bottom panel superimposed on the bottom panel of the main blank, said minor blank bottom panel having extensions from two opposed sides thereof to form side walls in the erected carton with each side wall including an inner and an outer wall member spaced from one another with a top wall member therebetween, tucking flaps from the ends of the minor blank side walls adapted to be enfolded between the main blank end wall inner and outer wall members, and means extending from the remaining edge of the blank bottom panel for engaging the minor blank bottom panel and thereby securing the blanks to one another upon erection of the carton, comprising foldable flaps from the side walls ends remote from the ends of the side walls carrying the tucking flaps with said foldable flaps adapted to be folded onto the minor blank side walls interiorly of the carton, hold down flanges to the bottom of said foldable flaps overlying the minor blank bottom panel, and a locking panel hingedly connected with the free edge of the said bottom panel of the main blank onto the bottom panel of the minor blank to engage the foldable flaps hold down flanges and thereby lock the carton in erected position.

6. In a device of the class described formed from a main and a minor blank, said main blank comprising a bottom panel having hingedly connected with each of three sides thereof an extension which when erected form opposed side walls with an end wall at one end of the side walls, the minor blank having a bottom panel superimposed on the bottom panel of the main blank, said minor blank bottom panel having extensions from two opposed sides thereof to form side walls in the erected carton with each side wall including an inner and an outer wall member spaced from one another with a top wall member therebetween, tucking flaps from the ends of the minor blank side walls enfolded between the main blank end wall inner and outer members, a locking panel hingedly connected to and extending from the remaining edge of the main blank bottom panel folded onto and engaging the minor blank bottom panel and thereby securing the blanks to one another upon erection of the carton and provide a three-walled carton with one side open, a member interiorly of the carton on the locking panel as a platform removably carried by the carton and disposed on the locking panel, said erected carton when reversed and resting on the edges of its side and end walls being usable as a play building and having slits formed in its bottom panel inwardly of its side walls, and tabs projecting from and carried by said removable member-platform inserted in the bottom panel slits inwardly of its side walls securing said removable member-platform to said carton for use as a play or toy building with a roof thereabove and the open side of the carton affording an entrance into the play or toy building.

7. In a device of the class described formed from a main and a minor blank, said main blank comprising a bottom panel having hingedly connected with each of three sides thereof an extension which when erected form opposed side walls with an end wall at one end of the side walls, the minor blank having a bottom panel superimposed on the bottom panel of the main blank, said minor blank panel having extensions from two opposed sides thereof to form side walls in the erected carton with each side wall including an inner and an outer wall member spaced from one another with a top wall member between, tucking flaps from the ends of the minor blank side walls enfolded between the main blank end wall inner and outer members, a locking panel hingedly connected to and extending from the remaining edge of the main blank bottom panel folded onto and engaging the minor blank bottom panel and thereby securing the blanks to one another upon erection of the carton and provide a carton having two side walls and one end wall with the fourth end open, a lid for said carton comprising a cover panel with depending side and end flanges, one of said end flanges having a height equal to the depth of the carton while the other end flange has a height less than the depth of the carton, said side flanges having a depth for a portion of their length equal to the depth of the end flange adjacent thereto and extending toward one another for distance from their respective end flanges, said side flanges having an offset for connecting the dissimilar depth portions thereof, said carton being adapted to be used in an inverted position as a toy building and said cover being adapted to be used as an auxiliary connected toy building, and means by removably interlocking said carton and cover when used as a toy building.

8. In a device of the class described formed from a main and a minor blank, said main blank comprising a bottom panel having hingedly connected with each of three sides thereof an extension which when erected form opposed side walls with an end wall at one end of the side walls, the minor blank having a bottom panel superimposed on the bottom panel of the main blank, said minor blank bottom panel having extension from two opposed sides thereof to form side walls in the erected carton with each side wall including an inner and an outer wall member spaced from one another with a top wall member between, tucking flaps from the ends of the minor blank side walls enfolded between the main blank end wall inner and outer wall members, a locking panel hingedly connected to and extending from the remaining edge of the main blank bottom panel folded onto and engaging the minor blank bottom panel and thereby securing the blanks to one another upon erection of the carton and provide a carton having two side walls and one end wall with the fourth end open, a lid for said carton comprising a covering panel with depending side and end flanges, one of said end flanges having a height equal to the depth of the carton while the other end flange has a height less than the depth of the carton, said side flanges having a depth for a portion of their length equal to the depth of the end flange adjacent thereto and extending toward one another for a distance from their respective end flanges, said flanges having an offset for connecting the dissimilar depth portions thereof, said carton being adapted to be used in an inverted position as a toy building and said cover being adapted to be used as an auxiliary connected toy building, means for removable interlocking said carton and cover when used as toy buildings, a member interiorly of the carton on the locking panel as a platform of a length and breadth corresponding to the length and breadth of the composite carton bottom within the walls thereof for supporting merchandise, said carton bottom panel having slits formed therein inwardly of its side walls, and tabs projecting from said platform removably securing the same to the carton bottom when the carton is used as a toy building to form a roof for the toy building.

9. In a device of the class described formed from a main and a minor blank, said main blank comprising a bottom panel having hingedly connected with each of three sides thereof an extension which when erected form opposed side walls with an end wall at one end of the side walls, the minor blank having a bottom panel superimposed on the bottom panel of the main blank, said minor blank bottom panel having extensions from two opposed sides thereof to form side walls in the erected carton with each side wall including an inner and an outer wall member spaced from one another with a top wall member therebetween, tucking flaps from the ends of the minor blank side walls enfolded between the main blank end wall inner and outer wall members, a locking panel hingedly connected to and extending from the remaining edge of the main blank bottom panel folded onto and engaging the minor blank bottom panel and thereby securing the blanks to one another upon erection of the carton and provide a carton having two side walls and one end wall with the fourth end open, a lid for said carton comprising a covering panel with depending side and end flanges, one of said end flanges having a height equal to the depth of the carton while the other end flange has a height less than the depth of the carton, said side flanges having a depth for a portion of their length equal to the depth of the end flange adjacent thereto and extending toward one another for a distance from their respective end flanges, said side flanges having an offset for connecting the dissimilar depth portions thereof, said carton being adapted to be used in an inverted position as a toy building and said cover being adapted to be used as an auxiliary connected toy building, means for removably interlocking said carton and cover when used as toy buildings, a member interiorly of the carton on the locking panel as a platform of a length and breadth corresponding to the length and breadth of the composite carton bottom within the walls thereof for supporting merchandise, said carton bottom having formed therein slits inwardly of its side walls and having additional slits adjacent the hinge line of the locking panel, and tabs projecting from said platform removably securing the same to the carton bottom when the carton is used as a toy building to form a roof for the toy building, extraneous end pieces for said roof conforming to the roof, and lugs projecting from the roof extraneous end pieces into the bottom panel additional slits and into the removable member-platform for removably securing said extraneous pieces in position.

10. In a device of the class described formed from a main and a minor blank, said main blank comprising a bottom panel having hingedly connected with each of three sides thereof an extension which when erected form opposed side walls with an end wall at one end of the side walls, the end wall having inner and outer wall members, the minor blank having a bottom panel superimposed on the bottom panel of the main blank, said minor blank bottom panel having extension from two opposed sides thereof to form side walls in the erected carton with each side wall including an inner and an outer wall member spaced from one another with a top wall member therebetween, tucking flaps from the ends of the minor blank side walls enfolded between the main blank end wall inner and outer wall members, a bottom wall upstanding from the remaining edge of the main blank bottom panel, a locking panel of an area substantially equal to the area of the minor blank bottom panel between the side walls thereof and the main blank end and bottom walls and hingedly connected with the bottom wall folded into the carton between the minor blank side walls, and means associated with said locking panel and minor blank side walls for securing the locking panel in position upwardly spaced from the minor blank bottom panel a distance equal to the heighth of the bottom wall.

11. In a device of the class described formed from a main and a minor blank, said main blank comprising a bottom panel having hingedly connected with each of three sides thereof an extension which when erected form opposed side walls with an end wall at one end of the side walls, the end wall having inner and outer wall members, the minor blank having a bottom panel superimposed on the bottom panel of the main blank, said minor blank bottom panel having extension from two opposed sides thereof to form side walls in the erected carton with each side wall including an inner and an outer wall member spaced from one another with a top wall member therebetween, tucking flaps from the ends of the minor blank side walls enfolded between the main blank end wall inner and outer wall members, a bottom wall from the remaining edge of the main blank bottom panel, a locking panel of an area substantially equal to the area of the minor blank bottom panel between the side walls thereof and the main blank end and bottom walls and hingedly connected with the bottom wall folded into the carton between the minor blank side walls, means associated with said locking panel and minor blank side walls for securing the locking panel in position upwardly spaced from the minor blank bottom panel a distance equal to the heighth of the bottom wall, and foldable flaps from the free ends of the main blank side walls enfolding the free ends of the minor blank side walls and lying against the inner surfaces of the said minor blank side walls between the said minor blank side walls and adjacent edge of the locking panel.

12. In a carton of the class described formed from a main and a minor blank, the main blank comprising a bottom panel substantially rectangular in plan, extensions hingedly connected with each edge of the bottom panel, at least three extensions being subdivided into panels to form carton walls each of an inner and an outer wall member and provide in the erected carton the exterior surfaces of said walls, the extensions forming two opposed walls of said walls each having its inner and outer wall members in direct contact while the extension forming the remaining wall of said walls provides the inner and outer wall members thereof spaced from one another with a top wall member between them, the minor blank having a bottom panel substantially rectangular in plan and superimposed on the bottom panel of the main blank and having extensions hingedly connected only to two opposed sides subdivided into panels to form walls on said minor blank each of an inner and an outer wall member, said minor blank walls having their outer wall members adjacent the inner wall members of the opposed walls of contacting inner and outer wall members of the main blank and with said minor blank inner wall members forming in the erected carton the interior exposed surfaces of said walls, at least one of said walls of the minor blank having its inner and outer wall members spaced from one another an appreciable distance with a top wall member between them, and cooperating means on said blanks locking them in operative relation to one another upon erection.

13. In a carton of the class described formed from a main and a minor blank, the main blank comprising a bottom panel substantially rectangular in plan, extensions hingedly connected with each edge of the bottom panel, at least three extensions being subdivided into panels to form carton walls each of an inner and an outer wall member and provide in the erected carton the exterior surfaces of said walls, the extensions forming two opposed walls of said walls each having its inner and outer wall members in direct contact while the extension forming the remaining wall of said walls provides the inner and outer wall members thereof spaced from one another with a top wall member between them, the minor blank having a bottom panel substantially rectangular in plan and superimposed on the bottom panel of the main blank and having extensions hingedly connected only to two opposed sides subdivided into panels to form walls on said minor blank each of an inner and an outer wall member, said minor blank walls having their outer wall members adjacent the inner wall members of the opposed walls of contacting inner and outer wall members of the main blank and with said minor blank inner wall members forming in the erected carton the interior exposed surfaces of said walls, at least one of said walls of the minor blank having its inner and outer wall members spaced from one another an appreciable distance with a top wall member between them, said minor blank inner wall members having slits formed therein, and locking tabs projecting from the ends of the inner wall member of the spaced apart inner and outer wall members of the main blank into the minor blank inner wall members slits locking the blanks in operative relation to one another.

14. In a carton of the class described formed from a main and a minor blank, the main blank comprising a bottom panel substantially rectangular in plan, extensions hingedly connected with each edge of the bottom panel, at least three extensions being subdivided into panels to form carton walls each of an inner and an outer wall member and provide in the erected carton the exterior surfaces of said walls, the extensions forming two opposed walls of said walls each having its inner and outer wall members in direct contact while the extension forming the remaining wall of said walls provides the inner and outer wall members thereof spaced from one another with a top wall member between them, the minor blank having a bottom panel substantially rectangular in plan and superimposed on the bottom panel of the main blank and having extensions hingedly connected only to two opposed sides subdivided into panels to form walls on said minor blank each of an inner and an outer wall member, said minor blank walls having their outer wall members adjacent the inner wall members of the opposed walls of contacting inner and outer wall members of the main blank and with said minor blank inner wall members forming in the erected carton the interior exposed surfaces of said walls, at least one of said walls of the minor blank having its inner and outer wall members spaced from one another an appreciable distance with a top wall member between them, said minor blank inner wall members having slits formed therein, locking tabs projecting from the ends of the inner wall member of the spaced apart inner and outer wall members of the main blank into the minor blank inner wall members slits locking the blanks in operative relation to one another, and tucking flaps from the ends of the walls of the minor blank disposed between and enfolded by the spaced apart inner and outer wall members of the main blank.

15. In a carton of the class described a main blank forming in the erected carton an external bottom panel rectangular in plan, an extension from each of two opposed edges of the bottom panel to provide carton side walls, an extension from each of the remaining two opposed bottom panel edges each subdivided into panels to form two opposed end walls each having its inner and outer wall members spaced from one another with a top wall member between them, said extensions providing the exterior surface for each carton wall, a minor blank forming in the erected carton an inner bottom panel rectangular in plan superimposed on the bottom panel of the main blank, said minor blank bottom panel having an extension hingedly connected to two opposed edges thereof subdivided into panels providing on said minor blank walls of spaced apart inner and outer wall members with a top wall member between them and with their outer wall members adjacent the main blank side walls and with said minor blank inner wall members forming the exposed inner surface of the carton side walls thus formed, and cooperating means on each of said blanks for locking them in operative relation to one another upon erection.

16. In a carton of the class described a main blank forming in the erected carton an external bottom panel rectangular in plan, an extension from each of two opposed edges of the bottom panel to provide carton side walls, an extension from each of the remaining two opposed bottom panel edges each subdivided into panels to form two opposed end walls each having its inner and outer wall members spaced from one another with a top wall member between them, said extensions providing the exterior surface for each carton wall, a minor blank forming in the erected carton an inner bottom panel rectangular in plan superimposed on the bottom panel of the main blank, said minor blank bottom panel having an extension hingedly connected to two opposed edges thereof subdivided into panels providing on said minor blank walls of spaced apart inner and outer wall members with a top wall member between them and with their outer wall members adjacent the main blank side walls and with said minor blank inner wall members forming the exposed inner surface of the carton side walls thus formed, said minor blank inner wall members having slits formed therein, and locking tabs projecting from the ends of the end walls inner wall members of the main blank into the minor blank inner wall members slits locking the blanks in operative relation to one another.

17. In a carton of the class described a main blank forming in the erected carton an external bottom panel rectangular in plan, an extension from each of two opposed edges of the bottom panel to provide carton side walls, an extension from each of the remaining two opposed bottom panel edges each being subdivided into panels to form two opposed end walls each having its inner and outer wall members spaced from one another with a top wall member between them, said extensions providing the exterior surface for each carton wall, a minor blank forming in the erected carton an inner bottom panel rectangular in plan superimposed on the bottom panel of the main blank, said minor blank bottom panel having an extension hingedly connected to two opposed edges thereof subdivided into panels providing on said minor blank walls of spaced apart inner and outer wall members with a top wall member between them and with their outer wall members adjacent the main blank side walls and with said minor blank inner wall members forming the exposed inner surface of the carton side walls thus formed, said minor blank inner wall members having slits formed therein, locking tabs projecting from the ends of the end walls inner wall members of the main blank into the minor blank inner wall members slits locking the blanks in operative relation to one another, and tucking flaps from the ends of the side walls of the minor blank disposed between and enfolded by the spaced apart inner and outer wall members of the end walls of the main blank.

WILLIAM P. FRANKENSTEIN.

REFERENCES CITED

The following references are of record in the file of this patent:

UNITED STATES PATENTS

| Number | Name | Date |
|---|---|---|
| Re. 21,158 | Frankenstein | July 25, 1939 |
| 1,906,622 | Kondolf | May 2, 1933 |
| 1,932,429 | Wellman | Oct. 31, 1933 |
| 1,941,538 | Costello | Jan. 2, 1934 |
| 2,008,664 | Dowst | July 23, 1935 |
| 2,313,376 | Ullman | Mar. 9, 1943 |
| 2,355,206 | Davidson, Jr. | Aug. 8, 1944 |
| 2,387,790 | Williamson | Oct. 30, 1945 |
| 2,531,255 | Clarke | Nov. 21, 1950 |